United States Patent [19]

Eschwey et al.

[11] 4,156,665

[45] May 29, 1979

[54] AQUEOUS DISPERSIONS OF ALKYD AND/OR AMINO RESINS CONTAINING GLYCIDE AND ETHYLENE OXIDE ADDUCTS TO HYDROPHOBIC COMPOUNDS

[75] Inventors: Helmut Eschwey, Odenthal; Joachim Galinke, Langenfeld; Norbert Wiemers, Monheim-Baumberg; Wolfgang Gress, Wuppertal-Elberfeld, all of Fed. Rep. of Germany

[73] Assignee: Henkel Kommanditgesellschaft auf Aktien, Düsseldorf-Holthausen, Fed. Rep. of Germany

[21] Appl. No.: 886,547

[22] Filed: Mar. 14, 1978

[30] Foreign Application Priority Data

Mar. 14, 1977 [DE] Fed. Rep. of Germany ....... 2710993

[51] Int. Cl.² .................... C09D 3/50; C09D 3/52; C09D 3/64; C09D 5/02
[52] U.S. Cl. .................. 260/22 EP; 260/21; 260/29.2 E; 260/29.2 UA; 260/29.4 R
[58] Field of Search ............ 260/22 EP, 21, 29.4 R, 260/29.2 E, 29.2 UA

[56] References Cited

U.S. PATENT DOCUMENTS

| | | | |
|---|---|---|---|
| 3,639,314 | 2/1972 | Cherubim et al. | 260/22 EP |
| 3,956,215 | 5/1976 | Lamanna et al. | 260/29.4 R |
| 3,959,230 | 5/1976 | Hays | 260/29.2 E |
| 3,996,172 | 12/1976 | Olstowski et al. | 260/22 EP |
| 4,077,991 | 3/1978 | Stevens et al. | 260/22 EP |

FOREIGN PATENT DOCUMENTS

| | | | |
|---|---|---|---|
| 1900964 | 8/1969 | Fed. Rep. of Germany | 260/22 EP |
| 942839 | 11/1963 | United Kingdom | 260/22 EP |

*Primary Examiner*—Ronald W. Griffin
*Attorney, Agent, or Firm*—Hammond & Littell

[57] ABSTRACT

Aqueous dispersions of cross-linkable alkyd and/or amino resins, which contain reactive surface active compounds produced by addition of glycide and/or ethylene oxide to a starting compound having a hydrophobic aliphatic radical, optionally substituted by an aryl radical, which contains at least one labile hydrogen atom which can react with an epoxide, wherein the number of hydroxyl groups in said surface active compounds is between 2 and 30, are useful as coating agents or varnish binding agents.

15 Claims, No Drawings

AQUEOUS DISPERSIONS OF ALKYD AND/OR AMINO RESINS CONTAINING GLYCIDE AND ETHYLENE OXIDE ADDUCTS TO HYDROPHOBIC COMPOUNDS

FIELD OF THE INVENTION

The present invention relates to aqueous dispersions of resins suitable as coating agents or varnish binding agents, which can be converted by a heat treatment into the cross-linked state and are distinguished by advantageous physical and chemical properties.

BACKGROUND OF THE INVENTION

It is known to use alkyd resins having high acid numbers for the production of varnish binding agents, which have good water solubility in the form of their amine salts. The disadvantages of systems of this kind, apart from their unsatisfactory waterproofness, are to be seen, in the majority of cases, in their considerable content of volatile amines and in some cases of toxic auxiliary solvents. When the varnish layer is baked these substances must be trapped by means of suitable absorption systems.

It is further known to modify the varnish binding materials by the incorporation of hydrophilic chains, particularly polyethylene glycol chains, in such a manner that self-emulsifying alkyd resins or melamine resins result. Furthermore, even without incorporation in the resin molecule, it is possible to use polyglycol ether derivatives, such as the adducts of ethylene oxide to fatty alcohols, as low molecular weight, non-ionic emulsifiers. In both cases, however, the hydrophilic radical remains active in the baked varnish layer and due to its hydrophilic nature, results in a susceptibility to penetration by water. In addition, a marked reduction in film hardness also often occurs.

OBJECTS OF THE INVENTION

An object of the present invention is the development of aqueous varnish systems which are superior to the known prior art systems, especially in yielding coatings which have vastly improved resistance to water penetration and superior film hardness.

Another object of the present invention is the development of aqueous varnish systems which can be used to coat the most varied materials such as glass, metals, etc. and which do not require a large volume of volatile organic solvents.

A further object of the present invention is the development of an aqueous dispersion which contains cross-linkable alkyd resins and/or amino resins and surface active substances having between 2 and 30 hydroxyl groups, produced by addition of glycide and/or ethylene oxide to a compound having a hydrophobic aliphatic radical said hydrophobic aliphatic radical having at least one labile hydrogen atom which can react with epoxides and optionally containing an aryl radical.

A still further object of the present invention is to provide an aqueous dispersion of resins suitable as a coating agent or varnish binding agent comprising still cross-linkable alkyd resins and/or amino resins and surface-active compounds having 2 to 30, more preferably 2 to 22, hydroxyl groups in the molecule, produced by the addition of glycide and/or ethylene oxide to a starting compound selected from the group consisting of (a) fatty alcohols having an average carbon atom content of approximately 12 to 22 carbon atoms, which optionally contain double bonds,
(b) alkyl phenols containing 1 or 2 phenolic OH groups in the molecule, and from 8 to 20 carbon atoms in the alkyl,
(c) fatty amines containing from 12 to 22 carbon atoms, which optionally contain hydroxyl groups,
(d) fatty acids having a chain length of approximately 12 to 22 carbon atoms and optionally containing double bonds and/or hydroxyl groups, and
(e) esters of said fatty acids with alkanepolyols having from 2 to 6 carbon atoms, said esters containing at least one hydroxyl group.

These and other objects of the present invention will become more apparent as the description thereof proceeds.

DESCRIPTION OF THE INVENTION

The above objects have been achieved by the development of aqueous dispersions comprising a content of still cross-linkable alkyd resins and/or aminoplast resins and of reactive surface active compounds having between 2 and 30 hydroxyl groups, which can be produced by addition of glycide and/or ethylene oxide to a compound containing a hydrophobic aliphatic radical, said hydrophobic aliphatic radical having at least one group which is capable of reacting with epoxides and optionally containing a aryl radical.

More particularly, the aqueous dispersions of the invention contain reactive surface-active compounds having 2 to 30, more preferably 2 to 22, hydroxyl groups in the molecule produced by the addition of glycide and/or ethylene oxide to a starting material selected from the group consisting of (a) fatty alcohols having an average carbon atom content of approximately 12 to 22 carbon atoms, which optionally contain one or more, more specifically one or two, double bonds,
(b) alkyl phenols containing 1 or 2 phenolic OH groups in the molecule, and preferably containing 8 to 20 carbon atoms in the alkyl radical,
(c) fatty amines, which optionally contain hydroxyl groups, more particularly 1 to 3 hydroxyl groups, and preferably have an alkyl radical of 12 to 22 carbon atoms,
(d) fatty acids having a chain length of approximately 12 to 22 carbon atoms, which optionally contain double bonds, more particularly 1 or 2 double bonds, and/or hydroxyl groups, more particularly 1 to 3 hydroxyl groups, and
(e) the condensation products of the above starting materials such as their esters, ethers and amides. Preferred condensation products are the partially esterified reaction products of the above-mentioned fatty acids with polyvalent alcohols, such as glycerin, trimethylolpropane, pentaerythritol and mannitol.

Among the above-mentioned addition products, preferred are the addition products of glycide or mixtures of glycide and ethylene oxide to alcohols or partially esterified alcohols, to alkyl phenols or fatty acids, and to the fatty amines or the fatty acid amides having 26 to 12 carbon atoms in the hydrophobic part of the molecule, wherein 2 to 22 hydroxyl groups are present in the molecule for each of said addition products.

The production of the above-mentioned surface-active compounds of the invention, which are made suitable for use in the aqueous dispersions of the invention, by means of the addition of the above-mentioned epoxides, is per se known or is carried out in accordance with methods known in themselves. Accordingly, as starting materials for the glycide or ethylene oxide addition it is possible to use, for example, fatty alcohols having an average carbon atom content of approximately 12 to 22 carbon atoms. For economic reasons, mixtures of fatty alcohols are used in the majority of cases, which, if desired, can also contain double bonds. In addition, alkyl phenols which contain 1 or 2 phenolic OH groups in the molecule, are also suitable as an initial or basic material. Amines are also suitable as a starting material. Included among such suitable amine starting materials are the so-called fatty amines, as well as fatty amines containing hydroxyl groups. Furthermore, fatty acids are also suitable as basic starting materials for the production of the surface-active substances of the invention. The chain length of these fatty acids should be between approximately 12 to 22 carbon atoms. These fatty acids can also contain double bonds or hydroxyl groups.

In addition to the above-mentioned basic starting materials their reaction products, such as their condensation products, particularly the esterification products of fatty acids with polyvalent alcohols, such as glycerin, trimethylolpropane, pentaerythritol and mannitol can also be used. These starting materials thus have from the outset a large number of hydroxyl groups, which can be used for the cross-linking reaction with the alkyd or amino resins. A hydroxyl group is formed by the addition of ethylene oxide to the above starting materials. If more ethylene oxide is introduced into the reaction than there are available reactive sites which are capable of reacting with it, a lengthening of the chain is achieved. By using excess glycide, on the other hand, an additional OH group per mole of glycide is introduced into the molecule. The quantity of the epoxides which are used to prepare the surface-active addition products of the invention is calculated so that the total of approximately 30 hydroxyl groups, preferably 22, in the molecule is not exceeded.

The reactive surface-active compounds of the invention are advantageously used in a quantity of approximately 0.5 to 10, preferably 2 to 8, percent by weight, relative to the total resin constituent. In choosing the quantity of reactive surface-active compounds to be used, its content of free hydroxyl groups should be matched to those groups, capable of reacting with said hydroxyl groups, which are present in the cross-linkable resin component of the aqueous dispersions. This determination of the quantity of surface-active compounds to be used in the aqueous dispersions of the invention is made more in accordance with empirical considerations than from a purely stoichiometric calculation. One skilled in the art can readily determine the desirable amount of surface-active compounds to be added by routine experimentation.

As the coating or varnish binding agent of the invention, those cross-linkable alkyd resins can be used which cannot be converted by amine neutralization into a water-soluble or dilutable form and are thus such as are normally applied in organic solvents. These alkyd resins suitably have an acid number of about 5 to 40, preferably from 10 to 25. Their fatty acid content should be between about 20 and 45 weight percent, relative to the solid resin. As the cross-linkable aminoplast resin component of the invention, those known preliminary resin condensates can be used which are also used in a conventional manner in systems containing a solvent, as, for example, the alkyl ethers of hexamethylol melamine. Examples of such ethers of hexamethylol melamine are the hexamethyl ether and the hexabutyl ether. Particularly favorable results are obtained when the alkyd resins and aminoplast resins are combined with each other. In practice resin combinations of 50 to 85% by weight of alkyd resin with 50 to 15% by weight of aminoplast resin have proved quite effective. In general, the total amount of resin used is such that the aqueous dispersion of the invention has a resin solids content of about 30 to 70% by weight.

Thus, more particularly, the aqueous dispersions of the invention are comprised of
 (a) from 30 to 70% by weight, based on the total weight of the aqueous dispersion, of a cross-linkable resin selected from the group consisting of alkyd resins, aminoplast resins and mixtures thereof,
 (b) from 0.5 to 10% by weight, based on the weight of the resins, of a surface-active compound having 2 to 30, more preferably 2 to 22, hydroxyl groups in the molecule, said surface-active compound being produced by the addition of glycide and/or ethylene oxide to a starting compound selected from the group consisting of
  (1) fatty alcohols having an average carbon atom content of approximately 12 to 22 carbon atoms, which optionally contain one or more, more specifically one or two, double bonds.
  (2) alkyl phenols containing 1 or 2 phenolic OH groups in the molecule, and preferably containing 8 to 20 carbon atoms in the alkyl radical,
  (3) fatty amines, which optionally contain hydroxyl groups, more particularly 1 to 3 hydroxyl groups, and preferably containing 12 to 22 carbon atoms,
  (4) fatty acids having a carbon chain length of approximately 12 to 22 carbon atoms, which optionally contain double bonds, more particularly 1 or 2 double bonds, and/or hydroxyl groups, more particularly 1 to 3 hydroxyl groups and
  (5) the condensation products of the above starting compounds, and
 (c) the remainder the aqueous liquid phase of the dispersion.

The production of the dispersions is effected in accordance with conventional dispersing or emulsifying methods at temperatures between about 20° C. and 100° C., and optionally under pressure at temperatures above 100° C. Water-miscible or at least partly water-soluble organic solvents, such as ethylene glycol monobutyl ether, phenyl ether, lower alcohol, e.g. butanol, and the like can be used in minor amounts in the aqueous liquid phase. Since these organic solvents serve, in the first instance, as processing aids they are used in a proportion which does not exceed 15% by weight, more particularly 10% by weight, relative to the total weight of the prepared aqueous dispersion. It can furthermore be advantageous to add to the dispersions small amounts of basic nitrogen compounds, such as tertiary or secondary aliphatic amines, among which may be mentioned dimethylethanolamine, triethanolamine, butyldiethanolamine, butylethylamine and the like. These compounds should not exceed a quantity of 2% by weight, relative to the total weight of the prepared aqueous dispersion.

The dispersions in accordance with the invention may comprise oil-in-water emulsions, which can be diluted to an unlimited extent with water. In contrast to the numerous known water dilutable, amine neutralized alkyd resin systems the dispersions in accordance with the invention show, even in the absence of auxiliary organic solvents, no maximum in the dilution curve, i.e. no viscosity anomaly (see e.g. E. Hüttmann et al., Plaste und Kautschuk [Plastics and Rubber] 17 (1970) 202).

The aqueous dispersions can be pigmented in accordance with conventional methods. The above-described combinations of alkyd resins with amino resins or corresponding preliminary condensates are distinguished as a varnish binding agent by their especially good properties. The baking of the varnish films, which is carried out by employing the dispersions of the invention in accordance with known methods, takes place after a pre-drying step at between about 120° and 180° C. in suitable drying ovens or drying ducts. The dispersions of the invention can be used to coat the most varied materials, such as glass or metals, e.g. aluminum, iron, steel and many others. The baked coatings are particularly distinguished by their improved waterproofness as well as by their great hardness. They are clearly superior with respect to their waterproofness to both the conventional emulsions based on non-reactive emulsifiers as well as the water-dilutable amine-neutralized systems. The advantages which are realized because of the extremely low content of volatile organic solvents contained in the dispersions of the invention should also be mentioned as a must important feature of the invention.

The present invention will now be further described by means of the following examples, which are not to be deemed limitative in any manner.

EXAMPLES

The following alkyd resins designated I to III and amino resins designated IV and V were used for the production of the dispersions in accordance with the invention.

Alkyd resin I was produced from
298 gm conjugated sunflower oil fatty acid
379 gm phthalic anhydride
32.6 gm benzoic acid
346.5 gm trimethylolpropane The alkyd resin had an oil content of 32%. It was condensed to the point at which the acid number was 20.

Alkyd resin II was produced from
400 gm conjugated sunflower oil fatty acid
380 gm phthalic anhydride
347 gm trimethylolpropane The alkyd resin had an oil content of 38%. It was condensed to the point at which the acid number was 18.

Alkyd resin III was produced from
400 gm conjugated sunflower oil fatty acid
340 gm phthalic anhydride
310 gm trimethylolpropane The alkyd resin had an oil content of 42%. It was condensed to the point at which the acid number was 15.

Amino resin IV consisted of a conventional commercial hexamethoxymethylmelamine.

Amino resin V consisted of a 67% solution of a conventional commercial hexamethoxymethylmelamine in ethylene glycol monobutyl ether.

Emulsifiers

In producing the following emulsifiers A to E of of Table 1, glycide or ethylene oxide was allowed to react with the compounds containing the hydroxyl or amino groups. The first column of the table gives the designation of the emulsifier A-E, followed by the hydrophobic components of the emulsifier which contain the hydroxyl groups and the added quantity of glycide or ethylene oxide and the last column gives the number of OH groups per molecule.

TABLE 1

| Emulsifier | Hydrophobic component | Glycide/Ethylene oxide | Hydroxyl groups/molecule |
|---|---|---|---|
| A | Nonylphenol | 10 moles glycide | 11 |
| B | Hexadecyl alcohol | 15 moles glycide | 16 |
| C | Dodecylamine | 5 moles glycide 5 moles ethylene oxide | 6 |
| D | Stearic acid | 10 moles glycide | 10 |
| E | Pentaerythritol monostearate | 15 moles ethylene oxide | 3 |

The following conventional commercial emulsifiers were used for comparative tests:

Comparative emulsifier a consisted of the addition product of 15 moles of ethylene oxide to 1 mole of nonylphenol.

Comparative emulsifier b consisted of the addition product of 20 moles of ethylene oxide to a mixture of approximately equal parts by weight of $C_{16}$- and $C_{18}$-fatty alcohols.

A. Production of Dispersions

The alkyd resin, emulsifier, water and an amine were heated to 80° C. Then they were dispersed using a high-speed agitator (10,000 rpm). After the dispersion was cooled down to approximately 25° C. the amino resin and, optionally, the ethylene glycol monobutyl ether were worked in. The dispersions in accordance with the invention, which can be diluted with water if required, had the following compositions.

| EXAMPLE 1 | |
|---|---|
| | Percent by Weight |
| Alkyd resin I | 34.5 |
| Amino resin V | 22.1 |
| Emulsifier A | 2.0 |
| Dimethylethanolamine | 1.3 |
| Water | 40.1 |

| EXAMPLE 2 | |
|---|---|
| | Percent by Weight |
| Alkyd resin III | 40.0 |
| Amino resin IV | 26.7 |
| Emulsifier B | 2.0 |
| Dimethylethanolamine | 1.5 |
| Ethylene glycol monobutyl ether | 8.0 |
| Water | 21.8 |

| EXAMPLE 3 | |
|---|---|
| | Percent by Weight |
| Alkyd resin II | 25.0 |
| Amino Resin V | 16.0 |
| Emulsifier C | 1.9 |
| Dimethylethanolamine | 0.5 |

-continued

| | Percent by Weight |
|---|---|
| Ethylene glycol monobutyl ether | 5.0 |
| Water | 51.6 |

EXAMPLE 4

| | Percent by Weight |
|---|---|
| Alkyd resin III | 35.0 |
| Amino resin IV | 23.3 |
| Emulsifier D | 1.7 |
| Dimethylethanolamine | 1.0 |
| Ethylene glycol monobutyl ether | 10.0 |
| Water | 29.0 |

EXAMPLE 5

| | Percent by Weight |
|---|---|
| Alkyd resin I | 32.7 |
| Amino resin V | 20.9 |
| Emulsifier E | 1.8 |
| Dimethylethanolamine | 1.2 |
| Ethylene glycol monobutyl ether | 5.0 |
| Water | 38.4 |

| Comparative examples | | Percent by Weight |
|---|---|---|
| (i) | Alkyd resin II | 32.75 |
| | Amino resin IV | 22.40 |
| | Comparative emulsifier a | 2.25 |
| | Dimethylethanolamine | 1.50 |
| | Ethylene glycol monobutyl ether | 5.00 |
| | Water | 36.10 |

| | | Percent by Weight |
|---|---|---|
| (ii) | Alkyd resin II | 32.75 |
| | Amino resin IV | 22.40 |
| | Comparative emulsifier b | 2.25 |
| | Dimethylethanolamine | 1.50 |
| | Ethylene glycol monobutyl ether | 5.00 |
| | Water | 36.10 |

B. Testing of Films from Dispersions

In order to test the films which can be produced from the above dispersions, glass plates were coated with them and baked for 30 minutes at 150° C. The thickness of the dry film was 50μm. The hardness of the film was determined by measuring the pendulum hardness in accordance with DIN 53 157.

To determine their waterproofness, the films were dipped in distilled water at 40° C. and evaluated with regard to the formation of bubbles and any signs of peeling after 1, 5, 10, 20 and 30 hours. The evaluation was carried out in accordance with a 5-point system:
1. Film unaltered
2. Beginnings of bubble formation at the edge
3. Light bubble formation over the entire film surface
4. Strong bubble formation over the entire film surface
5. Film has peeled away from the glass backing All films were clear and shiny apart from comparative example (ii) which gave a dull to lightly cloudy film.

The following Table 2 gives the pendulum hardness and the behavior with regard to distilled water for the above examples in accordance with the above-mentioned procedures.

TABLE 2

| Example | Pendulum hardness (DIN 53 157) (Sec.) | WATERPROOFNESS | | | | |
|---|---|---|---|---|---|---|
| | | 1 hr | 5 hrs | 10 hrs | 20 hrs | 30 hrs |
| 1 | 122 | 1 | 1 | 1 | 1 | 1-2 |
| 2 | 115 | 1 | 1 | 1 | 1 | 1 |
| 3 | 108 | 1 | 1 | 1 | 1-2 | 1-2 |
| 4 | 105 | 1 | 1 | 1 | 1 | 1 |
| 5 | 110 | 1 | 1 | 1-2 | 1-2 | 1-2 |
| Comparison i | 100 | 1 | 1-2 | 2 | 4 | 4 |
| Comparision ii | 40 | 2 | 3 | 4 | 5 | 5 |

The results presented above show the clear superiority of the films prepared using the emulsifiers of the invention over the films prepared using the comparative emulsifiers of the prior art. Whereas all films prepared in accordance with the present invention were clear and shiny, a dull to lightly cloudy film was obtained for comparative example ii. The results in the above table further demonstrate that the films of the present invention are considerably superior to those of the prior art in both pendulum hardness and waterproofness.

The preceding specific embodiments are illustrative of the practice of the invention. It is to be understood, however, that other expedients known to thos skilled in the art or described herein, may be employed without departing from the spirit of the invention or the scope of the appended claims.

We claim:
1. An aqueous dispersion of resins suitable as a coating agent or varnish binding agent, comprising a content of
   (1) cross-linkable resins selected from the group consisting of alkyd resins, aminoplast resins and mixtures thereof,
   (2) at least one reactive surface-active compound having 2 to 30 hydroxyl groups in the molecule produced by the addition of glycide and/or ethylene oxide to a starting compound selected from the group consisting of
      (a) fatty alcohols having an average carbon atom content of approximately 12 to 22 carbon atoms, which optionally contain one or two double bonds,
      (b) alkyl phenols containing 1 or 2 phenolic OH groups in the molecule and 8 to 20 carbon atoms in the alkyl radical,
      (c) fatty amines containing from 12 to 22 carbon atoms and optionally 1 to 3 hydroxyl groups,
      (d) fatty acids having a chain length of approximately 12 to 22 carbon atoms, which optionally contain 1 or 2 double bonds and/or 1 to 3 hydroxyl groups, and
      (e) esters of said fatty acids with alkanepolyols having from 2 to 6 carbon atoms, said esters containing at least one hydroxyl group, and
   (3) an aqueous medium.

2. The aqueous dispersion of claim 1, wherein the reactive surface-active compound is produced by the addition of glycide and/or ethylene oxide to a partially esterified reaction product of a fatty acid having a chain length of approximately 12 to 22 carbon atoms, which optionally contains 1 or 2 double bonds and/or 1 to 3 hydroxyl groups, with a polyvalent alcohol selected from the group consisting of glycerin, trimethylolpropane, pentaerythritol and mannitol.

3. The aqueous dispersion of claim 1, wherein said reactive surface-active compound has between 2 and 22 hydroxyl groups in the molecule and is the addition product of glycide or mixtures of glycide and ethylene oxide to a member selected from the group consisting of fatty alcohols, partially esterified fatty alcohols, alkyl phenols, fatty acids, fatty amines and fatty acid amides having 26 to 12 carbon atoms in the hydrophobic part of the molecule.

4. The aqueous dispersion of claim 1, comprising
   (a) from 30 to 70% by weight, based on the total weight of the aqueous dispersion, of a resin selected from the group consisting of alkyd resins, aminoplast resins, and mixtures thereof,
   (b) from 0.5 to 10% by weight, based on the weight of said resins, of said reactive surface-active compound,
   (c) from 0–2% by weight, based on the total weight of the aqueous dispersion, of a basic nitrogen compound selected from the group consisting of a tertiary and a secondary aliphatic amine, and
   (d) the remainder of an aqueous liquid phase consisting of water and 0–15% by weight based on the total weight of the aqueous dispersion, of an at least partly water-soluble organic solvent.

5. The aqueous dispersion of claim 4 wherein the resin comprises 50 to 85% by weight of alkyd resin and 50 to 15% by weight of aminoplast resin.

6. The aqueous dispersion of claim 4 which contains 2 to 8% by weight, based on the weight of the resins, of said reactive surface-active compound.

7. The aqueous dispersion of claim 4 which contains 1–10% by weight, based on the total weight of the aqueous dispersion, of the at least partly water-soluble organic solvent.

8. The aqueous dispersion of claim 4 wherein the alkyd resins have an acid member of about 5 to 40 and an unsaturated fatty acid content between about 20 and 45% by weight, relative to the total weight of the solid alkyd resin.

9. The aqueous dispersion of claim 8 wherein the alkyd resins have an acid number of from 10 to 25.

10. The aqueous dispersion of claim 4 wherein the aminoplast resins are lower alkyl ethers of hexamethylolmelamine.

11. The aqueous dispersion of claim 10 wherein said lower alkyl ethers are selected from the group consisting of the hexamethyl and the hexabutyl ether.

12. The aqueous dispersion of claim 4 wherein the resin is a mixture of 50 to 85% by weight of an alkyd resin having an acid number of about 5 to 40 and an unsaturated fatty acid content between about 20 and 45% by weight, relative to the total weight of the solid alkyd resin, and 50 to 15% by weight of an alkyl ether of hexamethylolmelamine.

13. The aqueous dispersion of claim 12 which contains
   (a) a reactive surface-active compound selected from the group consisting of the addition product of glycide to nonylphenol, of glycide to hexadecyl alcohol, of a mixture of glycide and ethylene oxide to dodecylamine, of glycide to stearic acid and of ethylene oxide to pentaerythritol monstearate,
   (b) 0.5 to 2% by weight of a basic nitrogen compound selected from the group consisting of dimethylethanolamine, triethanolamine, butylethylamine and mixtures thereof, and
   (c) the remainder an aqueous liquid phase consisting of water and 0–15% by weight, based on the total weight of the aqueous dispersion, of an at least partly water-soluble organic solvent selected from the group consisting of ethylene glycol monobutyl ether, phenyl ether, butanol and mixtures thereof.

14. A process of forming a baked coated surface comprising the steps of
   (a) applying the aqueous dispersion of claim 1 to the surface to form a coating thereon,
   (b) drying and baking, with a heating means, the coated surface at about 100°–200° C., and
   (c) removing the baked coated surface from said heating means.

15. The baked coated surface produced by the process of claim 14.

* * * * *